United States Patent [19]
Oldendorf et al.

[11] Patent Number: 5,847,328
[45] Date of Patent: Dec. 8, 1998

[54] ELECTRIC BALANCE FOR CORRECTING MISLOADING THEREOF

[75] Inventors: Christian Oldendorf, Göttingen; Franz-Josef Melcher, deceased, late of Hardegsen, by Rudolf Koehler, representative; Christoph Berg, Göttingen, all of Germany

[73] Assignee: Sartorius AG, Göttingen, Germany

[21] Appl. No.: 397,958

[22] Filed: Mar. 3, 1995

[30] Foreign Application Priority Data

Mar. 5, 1994 [DE] Germany .......................... 44 07 433.6

[51] Int. Cl.$^6$ ........................... G01G 23/14; G01G 23/36
[52] U.S. Cl. ..................................... 177/25.11; 177/25.16; 177/25.19; 141/83
[58] Field of Search .............................. 177/25.14, 25.15, 177/25.16, 25.17, 25.19, 25.13, 25.11; 141/83; 364/709.03

[56] References Cited

U.S. PATENT DOCUMENTS 4,911,256  3/1990  Attikiouzel ............................ 177/25.16
5,544,684  8/1996  Robinette, III ............................ 141/83

*Primary Examiner*—Michael L. Gellner
*Assistant Examiner*—Randy W. Gibson
*Attorney, Agent, or Firm*—Eric P. Schellin

[57] ABSTRACT

In an electronic balance for loading having a balance scale (3), weighing system, display (19), control keyboard (21 to 26) and a digital processing electronic circuitry in which circuitry at least one memory is present for the weighed value shown in the display (19). A first additional key (25) is present in the control keyboard (21 to 26) upon the actuation of the key the weighed value shown in the display (19) and stored in the digital signal processing electronics is decreased and upon the first actuation of the key the weighed value displayed immediately previously is taken in addition into a first additional memory. Furthermore, a second additional key (24) is present in the control keyboard (21 to 26) upon whose actuation the weighed value displayed in the display (19) is taken into a second additional memory. By means of the decreasing key the balance operator can decreased the display from the too large actual value step-by-step to the correct theortical value. Since the overload is generally only a few numerical steps of the balance display, this is achieved with a few steps. The balance can calculate the percentage overload by storing the balance display prior to the decreasing and during the conclusion of the decreasing and subsequently bring about the same overloading in the known manner for each of the remaining components. This creates the possibility even for simple loading balances without an electronic recipe memory of compensating an inadvertent overloading of a component by means of a overloading of the other components in equal percentage.

3 Claims, 4 Drawing Sheets

5,847,328

ELECTRIC BALANCE FOR CORRECTING MISLOADING THEREOF

The invention relates to an electronic balance for loading having a balance scale, weighing system, display, control keyboard and a digital processing electronic circuitry in which circuitry at least one memory is present for the weighed value shown in the display.

BACKGROUND OF THE INVENTION

Balances of the type with which the present invention is concerned are generally known and are described e.g. in DD 265 229.

A disadvantage of the known balances is the fact that when loading a balance with a formulation an inadvertent overloading of a component is difficult to cancel. In general, the attempt is made in this instance to retrieve the overloaded portion of the mixing vessel. Which, however, works somewhat only in the case of granular components but becomes difficult in the case of viscous components and is virtually totally impossible in the case of liquid-like components, which mix very rapidly. In addition, there is the danger in all cases that previous components are inadvertently removed also, which completely adulterates the formulation and, when the removed substance is reused, for instance, the next formulation is adulterated. In order to avoid this problem large, computer-supported loading systems have the possibility of rectifying overloads by also overloading the other components in the same proportion to maintain appropriate proportions. To this end the balance or the thereto connected computer calculates the percentage of overloading and alters the sensitivity of the balance for the following components in such a manner that the given mixing ratio is continuously observed and only the total amount resultant is somewhat higher. The components before the overload must naturally be subsequently dosed. However, a prerequisite of this method is that the balance or the computer knows both the theoretical weight as well as the loaded actual weight and can calculate the percentage overloading therefrom. However, this prerequisite is not given in the case of simple balances without an appropriate connection to a computer and without a recipe or formulation memory inside the balance.

The balance in DD 265 229 solves the problem of overloading by means of a memory with associated assumption key, associated zeroizing key and associated tare display unit for each component of the formulation. Therefore the actual value of each component can be individually stored and displayed and as a result an overloading of a component can be rectified or corrected by a corresponding, appropriate overloading of the other component. However, the plurality of operating keys and displays renders the balance complex i.e. difficult to read, difficult to operate and expensive to manufacture. In spite of the considerable expense such a balance is not capable of calculating the amount of material of the components to be subsequently added, which has to be done manually with external calculating aids, which readily lead to errors.

The present invention has the object of creating a possibility also for simple loading balances without electronic formulation or recipe memory of compensating an inadvertent overloading of a component by means of an equivalent percentage overloading of the remaining components.

The present invention achieves this in that a first additional key is present in the control keyboard upon the actuation of which key the weighed value shown in the display and stored in the digital signal processing electronics is decreased and upon the first actuation of which key the weighed value displayed immediately previously is taken in addition into a first additional memory within the signal processing circuitry, that a second additional key is present upon its actuation the weighed value displayed in the display is taken into a second additional memory within the signal processing circuitry and that the digital signal processing circuitry calculates the percentage deviation from the difference of the values stored in the two additional memories relative to the value in the second additional memory and alters the sensitivity of the balance for the remaining to-be-added components by this percentage.

The balance operator can decrease the display from the too large actual value step-by-step to the correct theoretical value with the decrease key. Since the overloading is generally only a few numerical steps of the balance display, this can be achieved relatively easily with a few steps. As a result of storing the balance display prior to the decreasing and at the conclusion of the decreasing the balance can calculate the percentage overloading and subsequently bring about the identical overloading with regard to the remaining components in a known manner.

BRIEF DESCRIPTION OF THE INVENTION

The invention is described in the following using the schematic figures and the course of its operation is explained thereby.

Figure 1:
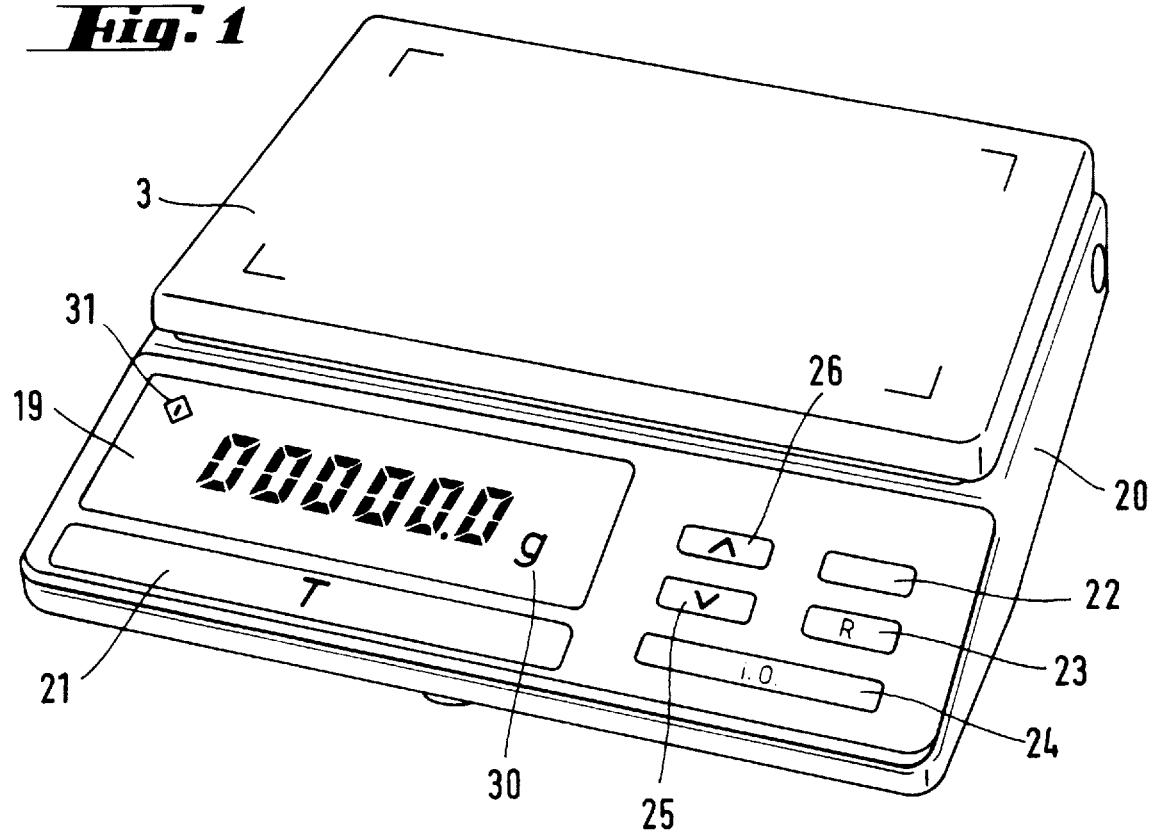
FIG. 1 shows a perspective external view of the balance.

The balance in FIG. 1 consists of a housing 20, balance scale 3 for receiving the material to be weighed, display 19 for showing the measured results and for operator guidance, as well as of several operating keys 21 to 26. Key 21 serves for zeroizing the display (tareing). Keys 22 to 26 are explained further below in the description of the dosing process.

Figure 2:
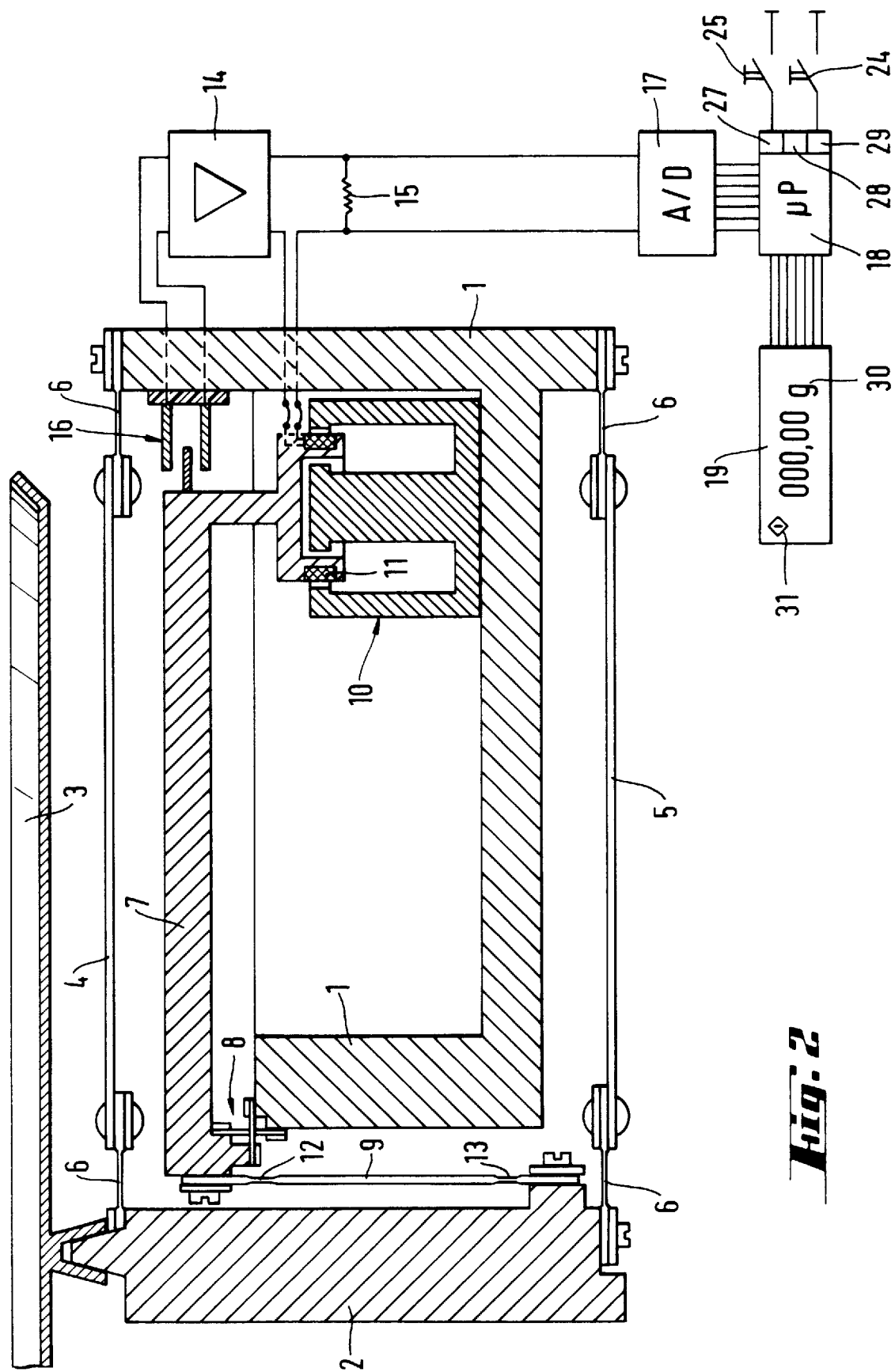
FIG. 2 shows a section through he mechanism of the balance and a block circuit diagram of the electronic circuitry.

FIG. 2 shows a section through the weighing system in an exemplary embodiment and a block circuit diagram of the associated electronics circuitry. Balance housing 20 and the voltage supply of the electronic circuitry have been omitted for the sake of clarity.

The weighing system consists of a system carrier 1 fixed to the housing, to which carrier load receiver 2 is operably secured so that it can move vertically via two guide rods 4, 5 with moving joints 6. Load receiver 2 carries load scale 3 for receiving the material to be weighed in its upper part and transfers the force corresponding to the mass of the material to be weighed via coupling element 9 with relatively thin areas 12, 13 onto the load arm of translation lever 7. Translation lever 7 is mounted by cross spring joint 8 to system carrier 1. A coil body with coil 11 is fastened to the compensation arm of translation lever 7. Coil 11 is located in the air gap of permanent magnet system 10 and generates the compensation force. The magnitude of the compensation current through coil 11 is regulated thereby in a known manner by position sensor 16 and automatic gain control amplifier 14 in such a manner that equilibrium prevails between the weight of the material to be weighed and the electromagnetically generated compensation force. The compensation current generates a measurable voltage on measuring resistor 15 which voltage is supplied to analogue-to-digital converter 17. The digitized result is assumed by digital signal processing electronics 18 and digitally displayed in display 19.

Balances of this type are generally known both as regards their construction and their operation, so that a detailed description can be eliminated.

Figure 4A:
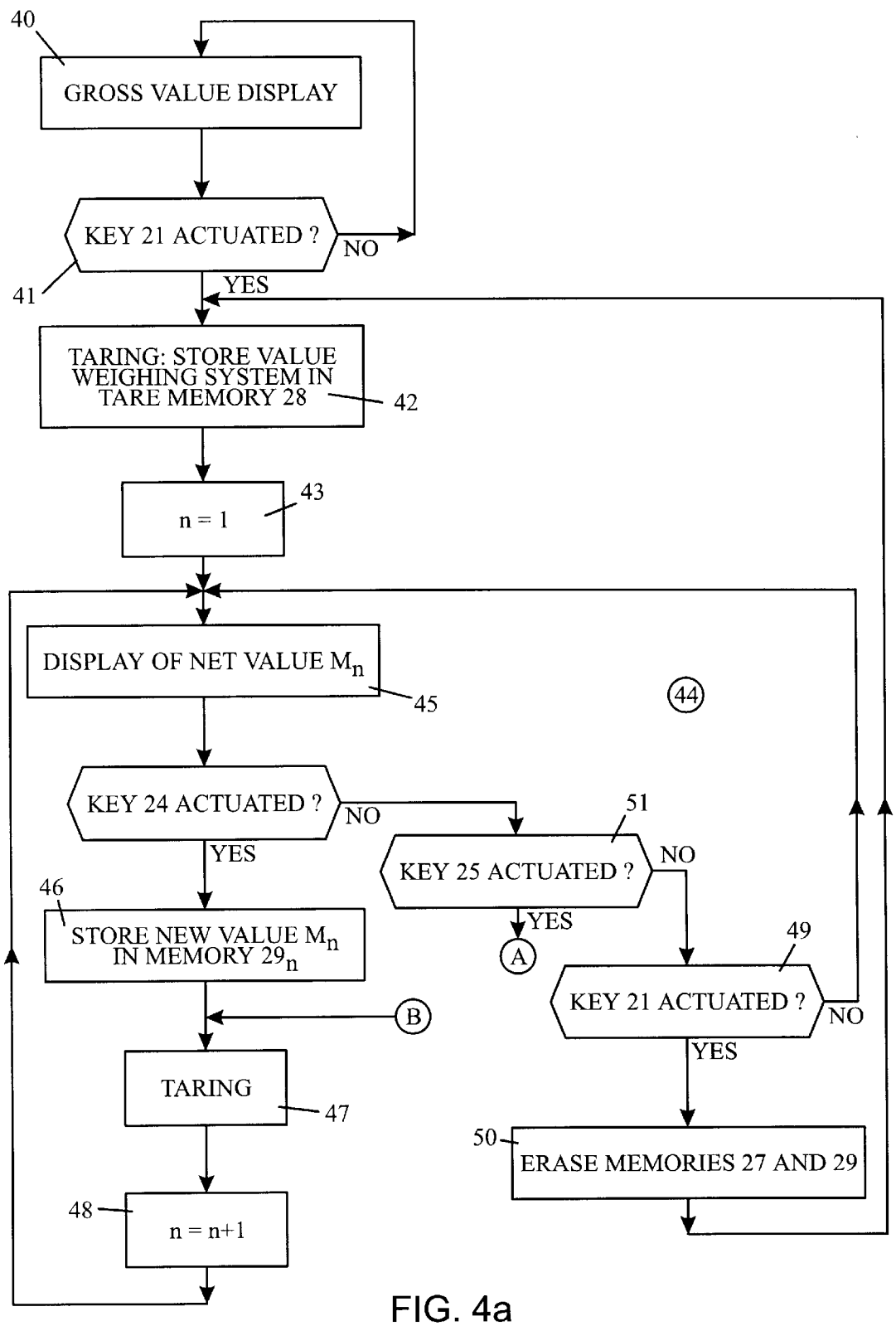
FIGS. 4a and 4b show a flow chart of the course of a dosing.

Several memory areas are present within the framework of digital signal processing electronics 18 of which memory areas 27, 28 and 29 are shown by way of example in FIG. 2. Of the various operating keys 21 to 26 only the two keys 24, 25 are shown in FIG. 2 for the sake of clarity; the other keys are connected in the same manner to digital signal processing electronics 18. The cooperation of the various keys and memory areas during loading is explained in the flow chart in FIGS. 4a and 4b.

1. The empty container is placed on balance scale 3 and display 19 shows the gross value (box 40).

2. Tare 21 is actuated (box 41), the instantaneous gross value is stored therewith from the weighing system into tare memory 28 and display 19 set to zero (box 42).

3. The first component (n=1 in box 43) is then dosed in. As long as neither key 24 nor key 21 is actuated the balance remains in closed circuit 44 and displays the gradually rising net weight $m_1$ (box 45). If the weight indicated in the recipe is achieved, the dosing of this first component is concluded by actuating key 24 and the net value displayed in balance display 19 is stored as the correct value in memory area $29_1$ (box 46). Index 1 in memory area 29 signifies thereby that memory area 29 contains memory locations for several components and that the memory location for the first component is busy here. At the same time, display 19 is reset to 0.0 g thereby, depending on the make-up of the recipe (if the theoretical weights are individually cited in the recipe; this is provided in FIG. 4a with box 47 ("taring") or if display 19 remains unchanged (if the sum of the components is indicated in the recipe; this is not shown in FIG. 4a).

4. Then, the component counter is raided t two (box 48: n=n+1) and the second component is dosed in the same manner. The end of the dosing is again actuated with key 24. The correct value of the second component is stored thereby at location 2 of memory area 29.

5. Then, the third and all further components are dosed in the same manner. If no dosing error occurs in any of these components the recipe has been concluded in an orderly manner. The values stored in memory area 29 are canceled (box 50) when a new, empty container is subsequently put on by actuating tare key 21 (box 49), since they are no longer required. In the flow chart of FIG. 4a the boxes 42, 43 and 45 are then passed through and the balance is ready for the dosing of the first component of the following recipe.

Figure 3:
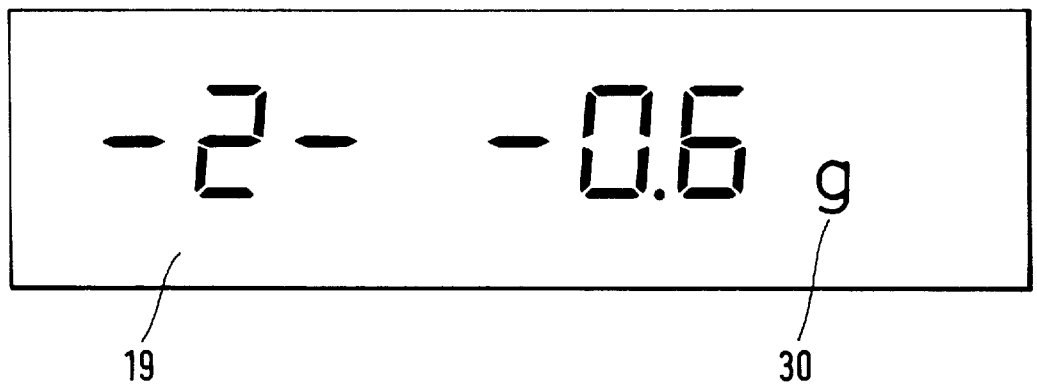
FIG. 3 shows the balance display during the subsequent loading of a second component.

If too much is inadvertently dosed in the operating sequence just described in the case of one of the components, e.g. in the case of the third component, for example, 125.4 g instead of 125.0 g, then the operator actuates key 25 (box 51) for decreasing. As a result thereof, the actual net value $m_3$ of 125.4 g is taken into memory area $27_3$ (box 52 in FIG. 4b). Index 3 signifies again that memory area 27 contains memory locations for several components and that the memory location here for the third component is busy. Furthermore, the value display in display 19 is decreased by one cipher step, accordingly 0.1 g to 125.3 g (box 53). Pressing key 25 three times more causes loop to be traversed three times more and display 19 is brought to the value 125.0 g. This value of 125.0 g is corroborated as the correct value by actuating key 24 (box 55) and stored in memory $29_3$ (box 56). Signal processing electronics 18 calculates the relative deviation c (box 57), in the example +0.32%, from the difference of the actual value stored in memory $27_3$ to the correct value stored in memory $29_3$, in the example 0.4 g, and divides (box 58) for the following components the net display of the balance by the value (1+c), that is, in the example, 1.0032, so that the following components are automatically dosed by 0.32% too much in comparison to the recipe. In the flow chart one passes from box 58 in FIG. 4b via point B back into the main branch of the flow chart in FIG. 4a. The relative mixing ratios of the third and following components thus agree with the recipe. In order to display this change of the sensitivity of the balance, gram symbol 30 goes out in display 19 and/or additional symbol 31 is selected and displayed. After the loading of the last component the correction process is started by actuating key 23 in which the components not yet overloaded in the correct proportion must be subsequently loaded thereon. In the given example of the incorrect loading of the third component over that of the two first components. The balance calculates thereby the missing amount for the overloading of 0.32% and displays it in the display as a negative value. (Shown as a lacking 0.6 g in FIG. 3 as example for the second component.) The operator must then load in up to the display of 0.0 g and confirm this by actuating key 24. The balance then shows the number of the next component and the lacking amount and confirms the conclusion of the correction e.g. by the displaying of "OK" after the lost component to be subsequently loaded.

Figure 4B:
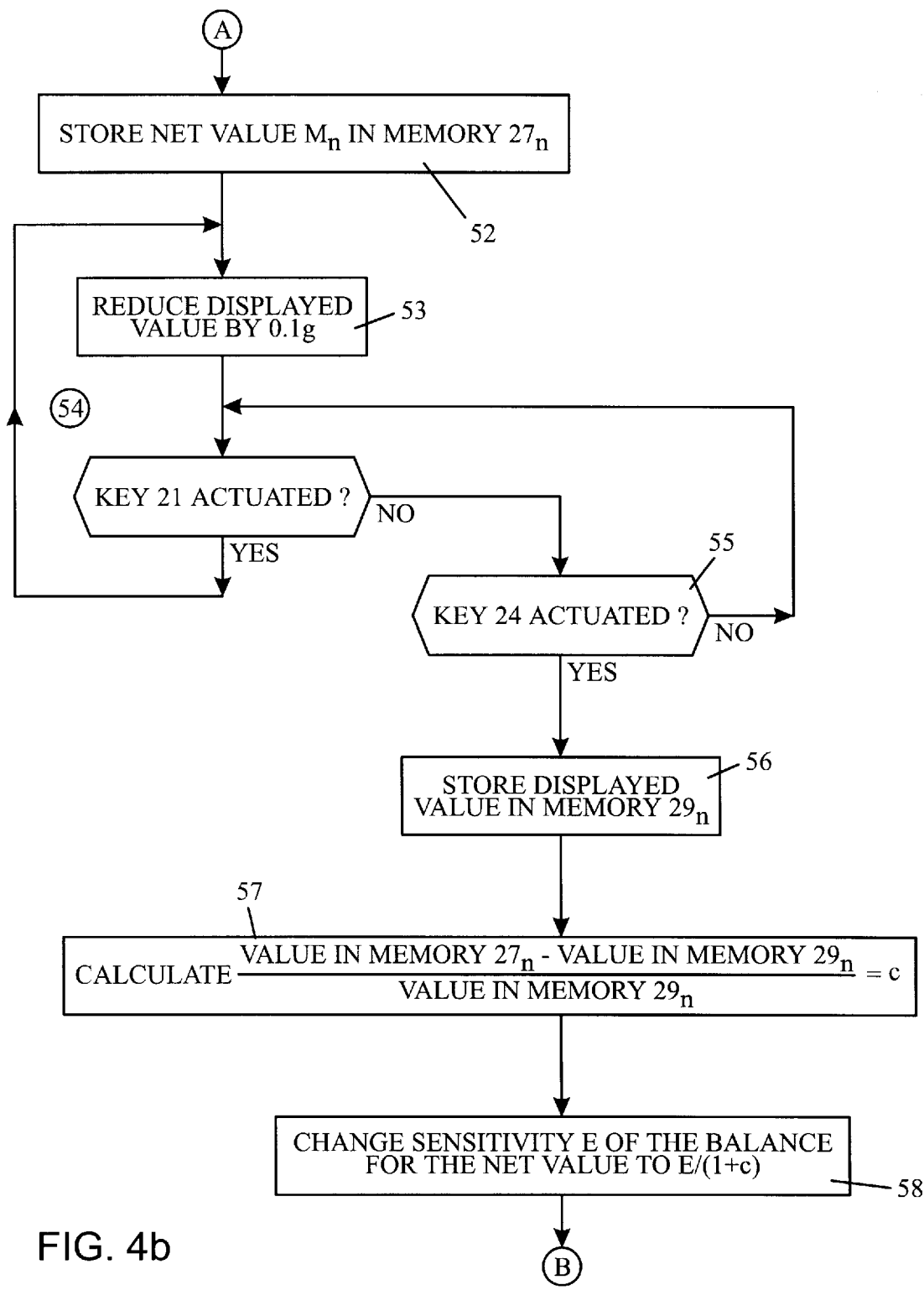

Key 26 is not activated until key 25 has been activated for the first time (box 51 in the flow chart of FIG. 4a); however, for the sake of clarity the querying of key 26 has not been shown in the flow chart of FIG. 4b. Key 22 can be busy, depending of the application, and, for example, select a printing mechanism.

The program sequence in signal processing electronics 18 was only roughly explained in the above and the mathematical details can be readily supplied by any programming expert.

We claim:

1. A method for weighing out quantities of ingredients based upon a recipe by weight of ingredients stored in electronic memory, including steps to proportionally make up for mistakes in the addition of one or more of the said ingredients comprising:

a. weighing a container on a balance scale and displaying the value thereof;

b. electronically storing said weight;

c. adding and weighing a first ingredient to said container and electronically storing said weight of said first ingredient;

d. determining whether the weight of said first ingredient is within the weight of the parameters called for in said recipe;

e. adding and weighing a second ingredient to said container and electronically storing said weight of said second ingredient;

f. subtracting the weight of said second ingredient called for in said recipe from the weight of said second ingredient when too much of the first ingredient has been added;

g. determining the ratios of said first ingredient and second ingredient called for in said recipe;

h. adding an additional amount of said first ingredient to said container in an amount to maintain the ratio amounts of said first ingredient and second ingredient called for in said recipe.

2. The method of claim 1 wherein the steps include the weighing of more than two ingredients.

3. An electronic balance for weighing out quantities of ingredients based upon a recipe of ingredients, comprising:

electronic storage memory for said recipe of said ingredients;

an ingredient weighing container positioned on said balance;

electronic storage memory for the weight of a first ingredient in said weighing container;

electronic storage memory for the weight of a second ingredient in said weighing container;

electronic means to subtract the weight of the second ingredient called for in said recipe from the weight of the second ingredient in said weighing container;

means to determine the ratio of the weights of said ingredients called for in said recipe;

display means to show the amount of said first ingredient needed to establish said ratio.

* * * * *